(12) United States Patent
Bolleter (10) Patent No.: US 11,317,996 B2
(45) Date of Patent: May 3, 2022

(54) TOOTH IMPLANT

(71) Applicant: DENTALPOINT AG, Zürich (CH)

(72) Inventor: Philip Bolleter, Zürich (CH)

(73) Assignee: DENTALPOINT AG, Zurich (CH)

( * ) Notice: Subject to any disclaimer, the term of this patent is extended or adjusted under 35 U.S.C. 154(b) by 174 days.

(21) Appl. No.: 16/582,516

(22) Filed: Sep. 25, 2019

(65) Prior Publication Data

US 2020/0085542 A1 Mar. 19, 2020

Related U.S. Application Data

(63) Continuation of application No. 14/773,229, filed as application No. PCT/EP2014/054481 on Mar. 7, 2014, now abandoned.

(30) Foreign Application Priority Data

Mar. 8, 2013 (CH) .................................... 00567/13

(51) Int. Cl.
*A61C 8/00* (2006.01)

(52) U.S. Cl.
CPC ............ *A61C 8/006* (2013.01); *A61C 8/0001* (2013.01); *A61C 8/0054* (2013.01); *A61C 8/0068* (2013.01); *A61C 8/0074* (2013.01)

(58) Field of Classification Search
CPC ..... A61C 8/006; A61C 8/0001; A61C 8/0007; A61C 8/0068; A61C 8/0054; A61C 8/005; A61C 8/0074; F16L 15/00; F16L 15/06; F16B 33/02

See application file for complete search history.

(56) References Cited

U.S. PATENT DOCUMENTS

| | | | |
|---|---|---|---|
| 4,259,072 A * | 3/1981 | Hirabayashi | A61C 8/0012 433/173 |
| 5,904,483 A | 5/1999 | Wade | |
| 6,174,166 B1 | 1/2001 | Joerneus | |
| 6,283,752 B1 * | 9/2001 | Kumar | A61C 8/0001 433/172 |
| 6,394,806 B1 * | 5/2002 | Kumar | A61C 8/008 433/141 |
| 6,464,500 B1 | 10/2002 | Popovic | |
| 6,663,389 B1 * | 12/2003 | Gallicchio | A61C 8/005 433/173 |
| 2003/0068599 A1 | 4/2003 | Balfour et al. | |
| 2003/0170587 A1 | 9/2003 | Augthun et al. | |
| 2003/0194679 A1 | 10/2003 | Odrich et al. | |
| 2004/0175673 A1 | 9/2004 | Zickman et al. | |
| 2008/0090211 A1 * | 4/2008 | Andersson | A61C 13/0003 433/201.1 |

(Continued)

FOREIGN PATENT DOCUMENTS

| | | |
|---|---|---|
| CH | 696 800 A5 | 12/2007 |
| CH | 704 382 A1 | 7/2012 |

(Continued)

*Primary Examiner* — Heidi M Eide
(74) *Attorney, Agent, or Firm* — Pauley Erickson & Swanson (57) ABSTRACT

The invention relates to an implant for osseointegration into a jaw bone, having a receiving opening one section of which is designed as an inner polygon, and at its distal end, the implant includes an indexing that reproduces the geometry of the inner polygon.

22 Claims, 12 Drawing Sheets

(56) References Cited

U.S. PATENT DOCUMENTS

| | | |
|---|---|---|
| 2008/0160483 A1 | 7/2008 | Danger et al. |
| 2009/0061389 A1* | 3/2009 | Lomicka ................ A61C 8/006 |
| | | 433/201.1 |
| 2010/0075277 A1* | 3/2010 | Wils ..................... A61C 8/0053 |
| | | 433/193 |
| 2010/0143869 A1* | 6/2010 | Padros Fradera ...... A61C 8/005 |
| | | 433/174 |
| 2010/0184004 A1 | 7/2010 | Fromovich |
| 2011/0123949 A1 | 5/2011 | Wolf et al. |
| 2012/0021381 A1 | 1/2012 | Hurson |
| 2012/0237899 A1 | 9/2012 | Holmstrom et al. |
| 2012/0288826 A1 | 11/2012 | Fitton, III |
| 2013/0209960 A1 | 8/2013 | Benhamou |
| 2016/0008100 A1 | 1/2016 | Bolleter |

FOREIGN PATENT DOCUMENTS

| | | |
|---|---|---|
| KR | 10-2007-0110062 A | 11/2007 |
| WO | WO 2006/047901 A1 | 3/2006 |

* cited by examiner

TOOTH IMPLANT

CROSS REFERENCE TO RELATED APPLICATIONS

This application is a continuation of U.S. patent application Ser. No. 14/773,229, filed on Sep. 4, 2015, which is a National Phase Application of PCT/EP2014/054481. The co-pending parent application is hereby incorporated by reference herein in its entirety and is made a part hereof, including but not limited to those portions which specifically appear hereinafter.

BACKGROUND OF THE INVENTION

Field of the Invention

The invention relates to a tooth implant according to the preamble of claim 1.

Discussion of Related Art

Numerous two-part tooth replacement systems produced from metal and ceramic materials are known from the prior art. Thus, development work has been carried out for years by the Applicant himself in the area of said two-part ceramic implant and one of said developments is marketed under the brand name of ZERAMEX® T. The ZERAMEX T connection is distinguished by a cylindrical fit and an inside polygon, preferably a triangle, which is arranged proximally with respect to the cylindrical fit in the implant. This allows for the positioning of the abutment, for example, in six different positions at in each case an angle of 60° and furthermore enables additional absorption of torque.

The jaw bone grows around the implant inside of an average healing period of six to eight weeks. The impression is taken as the next step with the subsequent manufacturing of the master model. It has become apparent that the jaw bone does not always grow straight around the implant, which makes impression-taking correspondingly more difficult. The reproduction of precise position of the implant by means of an impression is, however, important in order to be able to manufacture secondary parts such as the tooth crowns at a later date.

SUMMARY OF THE INVENTION

Proceeding from the prior art, it is the object of the invention to provide a tooth implant which enables simple and reliable positioning of auxiliary components and secondary parts. Said object is achieved by a tooth implant according to the invention in accordance with the independent claim and by a tooth replacement system according to the invention. Further preferred embodiments are provided in the dependent claims.

An implant is to be understood below as that part of a tooth replacement system which is admitted into the jaw bone. The elements that are connected to the implant are auxiliary components for temporary treatment or secondary parts for definitive treatment. Examples of such auxiliary components and secondary parts are impression copings, gingiva formers, healings caps, temporary abutments, solid secondary parts and rotation-proof, screw-connected abutments.

The implant according to the invention serves for osseointegration into a jaw bone and includes a receiving opening, wherein a portion of the receiving opening is realized as an inner polygon. At its distal end, the implant comprises an indexing which reproduces the geometry and the angular position of the inner polygon in the receiving opening of the implant. As a result, it is easy for the dentist or the orthodontist to recognize the position of the inner polygon on the distal end of the implant, it facilitates the positioning of secondary parts or auxiliary components and enables them to be aligned optimally with reference to the inner polygon in the interior of the implant. In addition, tension-free impression-taking is made possible as a result of the indexing even in the case of large angular divergences where the established implant is in an inclined position. Consequently, the result of the impression becomes more precise and the reject rate of pre-produced laboratory parts (crowns or bridges) is able to be reduced.

In a preferred embodiment, the indexing reproduces the radial angular position (with reference to the longitudinal axis of the implant) and the geometry including the arrangement and number of the side faces of the inner polygon. The indexing is arranged in a preferred manner on a shoulder which runs around the receiving opening, in particular in a preferred manner on an end face. When indexing is talked about within the framework of the present invention, said term also includes a multiple or plurality of part indexings which together form the indexing according to the invention.

In an embodiment of the invention, the receiving opening of the implant comprises an inner polygon, an internal thread, a cylinder which is arranged between the internal thread and the inner polygon, preferably a fitting cylinder. The proximal end of the receiving opening is formed by part of a bayonet closure. The simple fastening of auxiliary components to secondary parts is made possible as a result of the internal thread. A further advantage of the internal thread consists in its drainage function. If secondary parts, for example abutments, are not screw-connected but are cemented to the implant, the internal thread serves as a type of drainage channel which takes care of a uniform distribution of the cement, e.g. around an abutment coping. In addition, as a result of the thread geometry and the uniform distribution of the cement, a hydrostatic pump effect is prevented and consequently precise and sturdy positioning of the secondary components in the implant is ensured. The internal thread additionally creates the advantage of impression parts (impression coping, retaining pin) being able to be screw-connected sturdily to the implant. If the impression parts are not screw-connected but are only plugged into the implant, it is possible for them to be pressed away from the surrounding gingiva again and thus the impression becomes unusable.

If a fitting cylinder bore is referred to in the paragraphs below, said term includes not only bores but basically receiving openings in the implant irrespective of whether they have been created by means of bores or in another manner.

In an embodiment of the implant according to the invention, part of the receiving opening is realized as a fitting cylinder bore, wherein said fitting cylinder bore is combined with an internal thread and the internal thread and the fitting cylinder bore are arranged so as to be overlapping in the axial direction of the fitting cylinder bore. The advantages are that the fitting cylinder bore of the receiving opening serves as a threaded connection and/or forms a corresponding fit with a stem of a tooth replacement component.

In one embodiment the internal thread is ground into the fitting cylinder bore in such a manner that sufficient proportions of the fitting cylinder bore are maintained as cylindrical proportions. The cylindrical proportion of the fitting cylinder bore results in a more precise core diameter of the receiving opening which can be utilized for force absorption.

In one embodiment of the invention, the cylindrical proportions of the fitting cylinder bore are set up to form a fit with a stem of a tooth replacement component.

In a further embodiment of the invention, the internal thread, which overlaps the fitting cylinder bore, is screw-connected to an external thread of a tooth replacement component.

In a further embodiment of the invention, the stem of the tooth replacement component and the fitting cylinder bore of the implant form a fit and the external thread of the tooth replacement component forms a screw connection with the overlapping internal thread.

In one embodiment, the fitting cylinder bore of the implant comprises a cylindrical proportion of between 20% and 50%, with reference to its cylindrical lateral surface. The internal thread, which overlaps the fitting cylinder bore, includes between 50% and 80% of the cylindrical lateral surface of the fitting cylinder bore.

In a preferred embodiment, the fitting cylinder bore comprises a cylindrical proportion of 28%, measured on its cylindrical lateral surface. The internal thread, which overlaps the fitting cylindrical bore, comprises a proportion of 72% with reference to the cylindrical lateral surface. An advantage which results from the implant according to the invention or respectively from the tooth replacement system is that the tooth replacement component can be glued into the implant, it being possible to utilize the internal thread in a corresponding manner as a drainage channel for the adhesive.

The fit is a clearance fit according to ISO tolerance system 286-1, 286-2 with a maximum undersize of 0.03 mm. In a further embodiment, a further portion of the receiving opening is realized as part of a bayonet closure which serves for the purpose of fastening auxiliary components. In a preferred embodiment, the bayonet closure is arranged at the proximal end of the receiving opening.

In a further preferred embodiment, the bayonet closure is arranged distally with respect to the inner polygon of the receiving opening.

In a further preferred embodiment of the invention, the receiving opening of the implant comprises an inner polygon, part of a bayonet closure and a cylinder which is arranged between the bayonet closure and the inner polygon, preferably a fitting cylinder.

The indexing can be realized in a graphic and/or physical manner, for example in the form of notches, grooves, recesses or bores. In principle, all forms which enable a subsequent positionally-accurate alignment of the auxiliary components and secondary parts are conceivable.

In a preferred embodiment of the invention, the implant according to the invention is produced from a ceramic material, preferably from zirconium oxide and/or aluminum oxide.

In a preferred embodiment, the implant according to the invention is part of a tooth replacement system where the indexing of the implant serves for arranging at least one further tooth replacement component in a positionally-accurate manner.

In one embodiment, the tooth replacement system includes an implant with indexing, wherein said indexing comprises a geometry which corresponds with a proximal recess of a tooth replacement component or with other positive locking means of the tooth replacement system.

On the side which interacts with the indexing, such a tooth replacement component comprises positive locking means, preferably a proximal recess of the tooth replacement component which corresponds which the geometry of the indexing.

Positive locking means are to be understood as physical shapings on the tooth replacement component which are set up for the purpose of engaging in a positive locking manner in the indexing of the implant.

According to an exemplary embodiment, said recess of a tooth replacement component comprises the form of a polygon, the side faces of the polygon, in an assembled state in which the tooth replacement component is placed onto the implant, engaging in the indexing in at least one predefined angular position. As a result, the recess, and consequently the entire tooth replacement component, is aligned in a positionally-accurate manner in a desired angular position in relation to the proximal inner polygon of the receiving opening of the implant.

In one embodiment of the tooth replacement system according to the invention, the proximal recess of the tooth replacement component engages axially in the indexing with reference to a longitudinal axis of the implant.

In a further preferred embodiment of the invention, the tooth replacement component is constructed in two parts. The first part includes a screw thread which is screw-connected into the internal thread of the implant and can be used for fixing the second part on the implant. The second part comprises a proximal recess in the form of a polygon which, in turn, corresponds and interacts with the indexing of the implant in order to position the second part in a predefined angular position at the distal end of the implant.

In a further preferred embodiment of the invention, the tooth replacement component is an impression coping which includes a retaining pin as the first part and a transfer coping as a second part.

In a further preferred embodiment, the tooth replacement component is a one-part secondary part produced from plastic material, metal or ceramic material.

On account of the indexing according to the invention, it is possible to fasten rotation-proof crowns on a rotationally symmetrical secondary part, for example an abutment, without having to determine the precise angular position of the abutment. Thus, the problem of the reproducibility of a non-rotationally symmetrical secondary part is avoided. The abutment can be removed after try-in and used again.

BRIEF DESCRIPTION OF THE DRAWINGS

The invention is to be explained in more detail below by way of exemplary embodiments in conjunction with the drawing, in which.

DETAILED DESCRIPTION OF THE INVENTION

Figure 1:
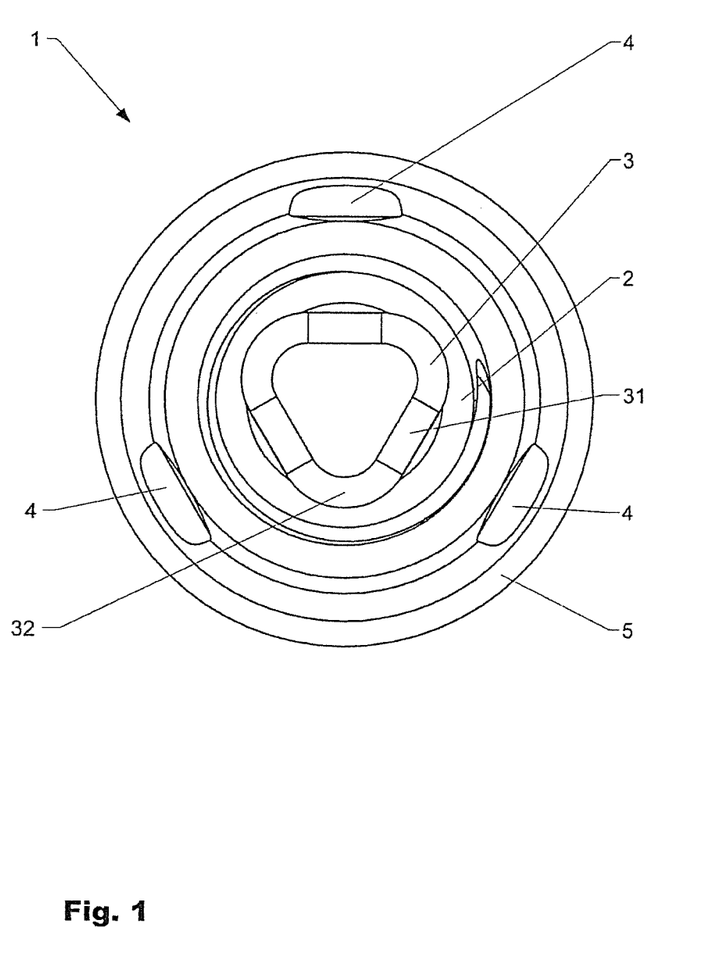
FIG. 1 shows a view from above of the implant according to the invention.

FIG. 1 shows a cross-sectional view from above of the tooth implant 1 according to the invention. In said preferred embodiment, the indexing 4 reproduces the side faces 31 of an inner polygon 3 which is realized as a triangle. The indexing 4 is arranged on the end face of a shoulder 5 which runs around the receiving opening 2. In a further embodiment of the invention, not shown in FIG. 1, the indexing 4 reproduces the edges of the inner polygon 3.

Figure 2:
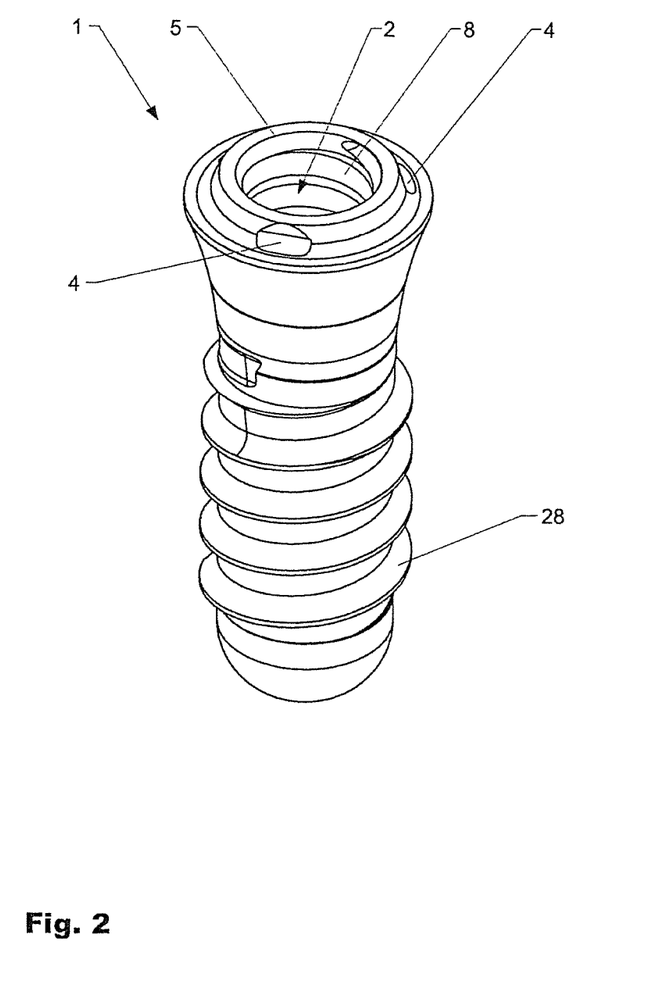
FIG. 2 shows a perspective representation of the implant according to the invention.

FIG. 2 discloses a perspective representation of the tooth implant 1 according to the invention. FIG. 2 shows the external thread 28 which runs around the implant body and serves for osseointegration into a jaw bone. FIG. 2 shows the indexing 4 in part, arranged on the shoulder 5 running around the receiving opening 2, as well as the internal thread 8 which serves, for example, for receiving a retaining pin of an impression coping.

Figure 3:
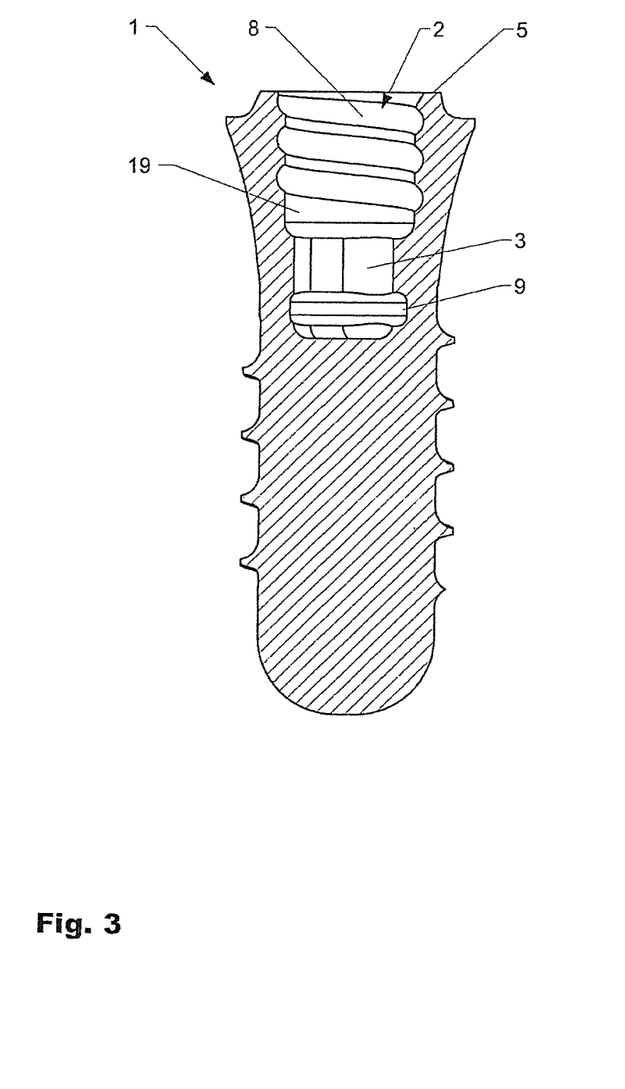
FIG. 3 shows a sectional representation of the implant.

FIG. 3 shows a sectional representation through the tooth implant 1 according to the invention. In the preferred embodiment according to FIG. 3, the receiving opening 2 includes a shoulder 5 which, when viewed from the distal to the proximal direction, runs around the receiving opening 2, the internal thread 8, a fitting cylinder 19, an inner polygon 3 and part of a bayonet closure 9. The fitting cylinder 19 is shown in a shortened manner.

Figure 4:
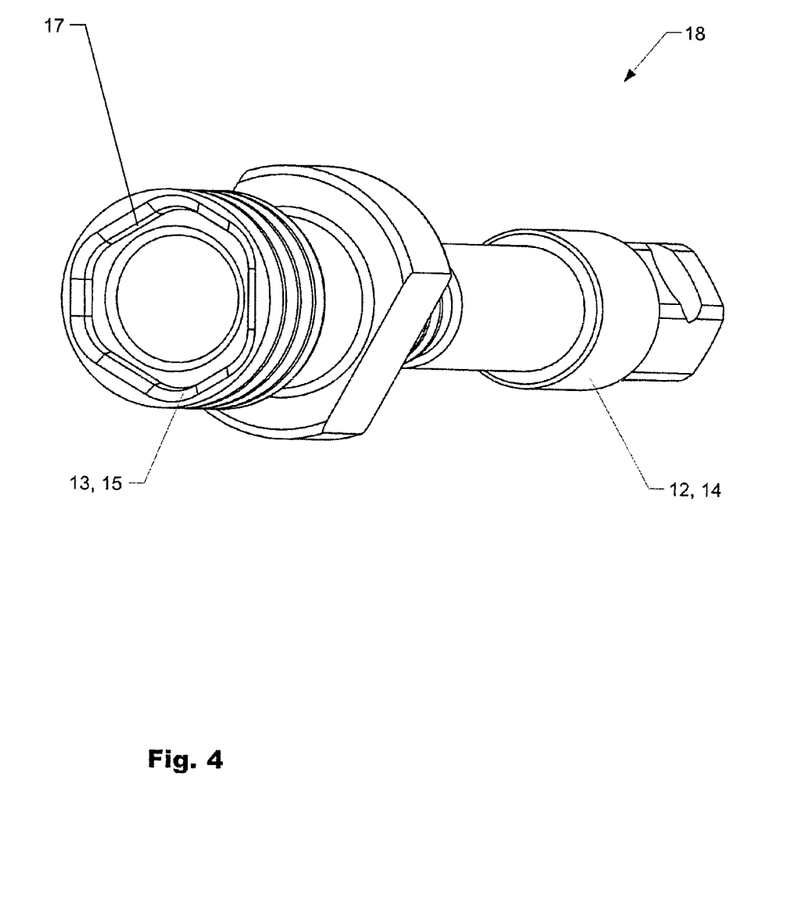
FIG. 4 shows a perspective view of a two-part impression coping.

FIG. 4 shows a perspective view of an impression coping 18 including a first part 12, the retaining pin 14 and a second part 13, the transfer coping 15. The retaining pin serves for the purpose of fixing the transfer coping 15 in the implant 1 when taking the impression. If the transfer coping 15 is placed onto the circumferential shoulder 5 of the implant 1 according to the invention, the proximal recess 17 engages in such a manner in the indexing that said recess is aligned in relation to the proximal inner polygon 3 of the receiving opening of the implant (not shown in FIG. 4). The transfer coping 15 serves, as explained in connection with FIG. 6, for transferring both the correct radial position and the correct axial position of the implant onto the casting compound which allows the dental technician to create the master model at a later date.

Figure 5:
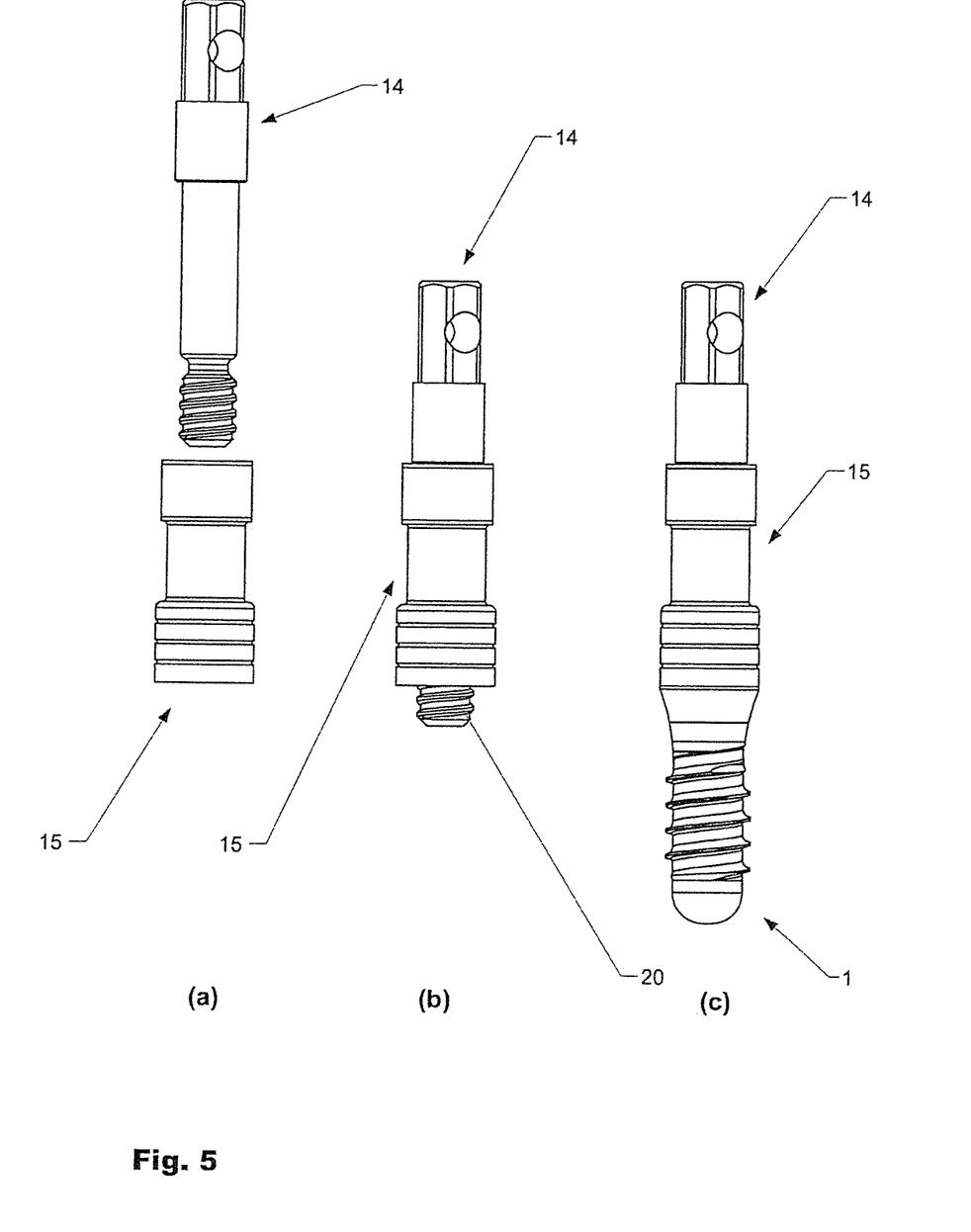
FIG. 5 shows (a) the impression coping from FIG. 4 including a transfer coping and a retaining pin in the unscrewed state and in a connected state (b) as well as the transfer coping and the retaining pin connected to the implant (c)

FIG. 5(a)-(c) shows the retaining pin 14 and the transfer coping 15. On the proximal end, the retaining pin 14 comprises a screw thread 20 which engages in the internal thread 8 of the implant (not shown) when the transfer post 15 is placed onto the implant 1. As has already been described in relation to FIG. 4, the reliable positioning of the impression coping 18 on the implant 1 is improved even more by the proximal recess engaging in the indexing (not visible in FIG. 5(c)).

Figure 6:
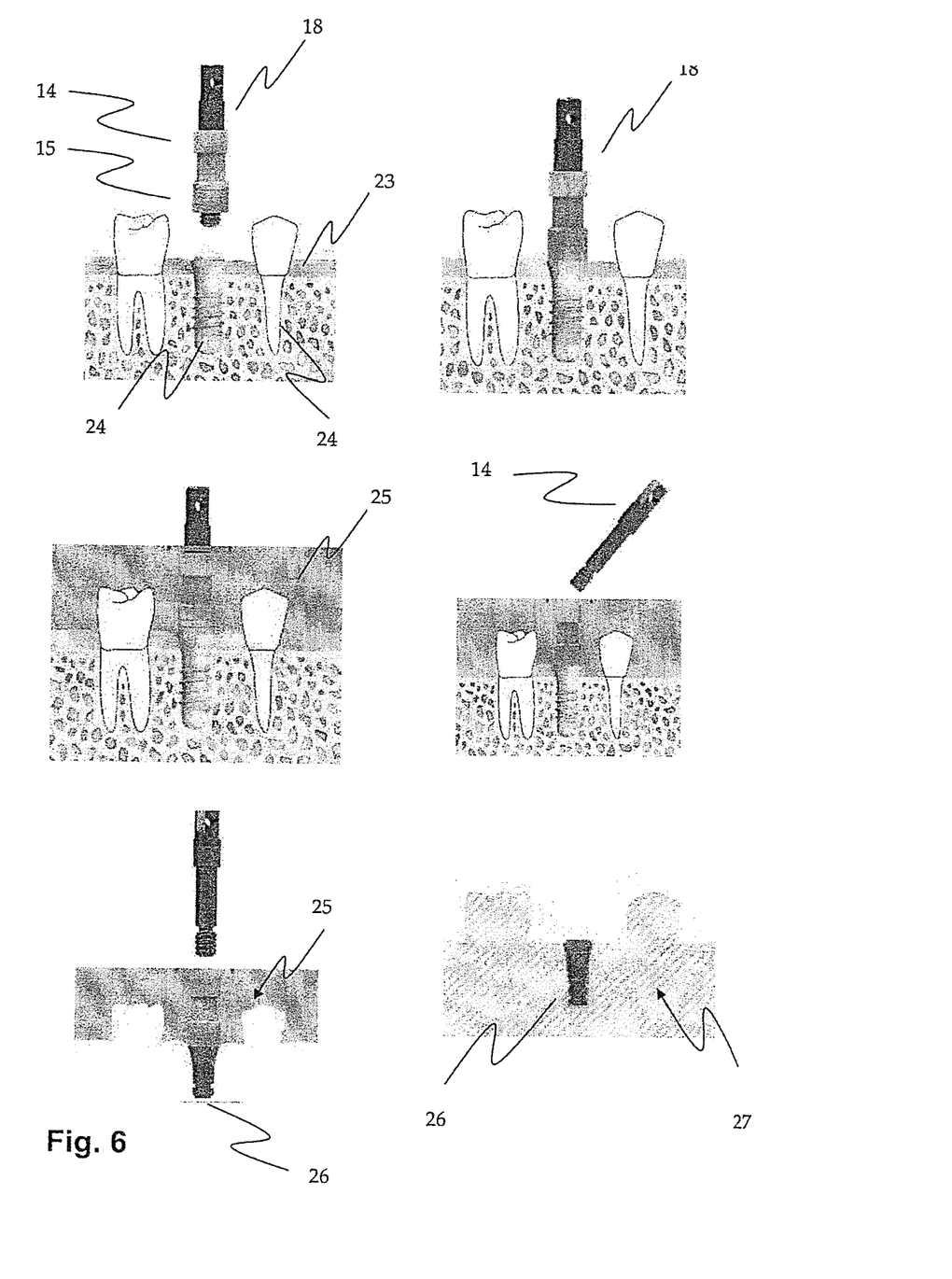
FIG. 6 shows sequence steps of the prosthetic treatment, indirect impression-taking with open tray.

FIG. 6 shows a schematic representation of the operating sequence when taking the impression with an open tray. The implant 1 is healed in the jaw bone 24 and passes through the gingival margin 23. A two-part impression coping 18 which includes a retaining pin 14 and a transfer coping 15 is used for carrying out a so-called pick-up impression. In the correct end position, the transfer coping 15 sits in a rotation-proof manner on the shoulder which runs around the receiving opening of the implant and is additionally fixed in the implant by the retaining pin 14. In the next step, the casting compound is distributed up to the height of the transfer coping 15 in the mouth of the patient. After the end of the hardening time of the casting compound, the retaining pin 14 is released and the casting compound 25 is removed together with the transfer coping 15 out of the mouth of the patient. In the dental laboratory, the transfer coping 15 is screw-connected to a replica 26 and the retaining pin 14 and the plaster model 27 is created. As a result of the indexing according to the invention, which can ensure the transfer coping is positioned in a rotation-proof manner on the established implant, the precise position of the implant can be transferred to the plaster model 27 for producing a secondary part in a precisely fitting manner (e.g. abutment, crown).

Figure 7:
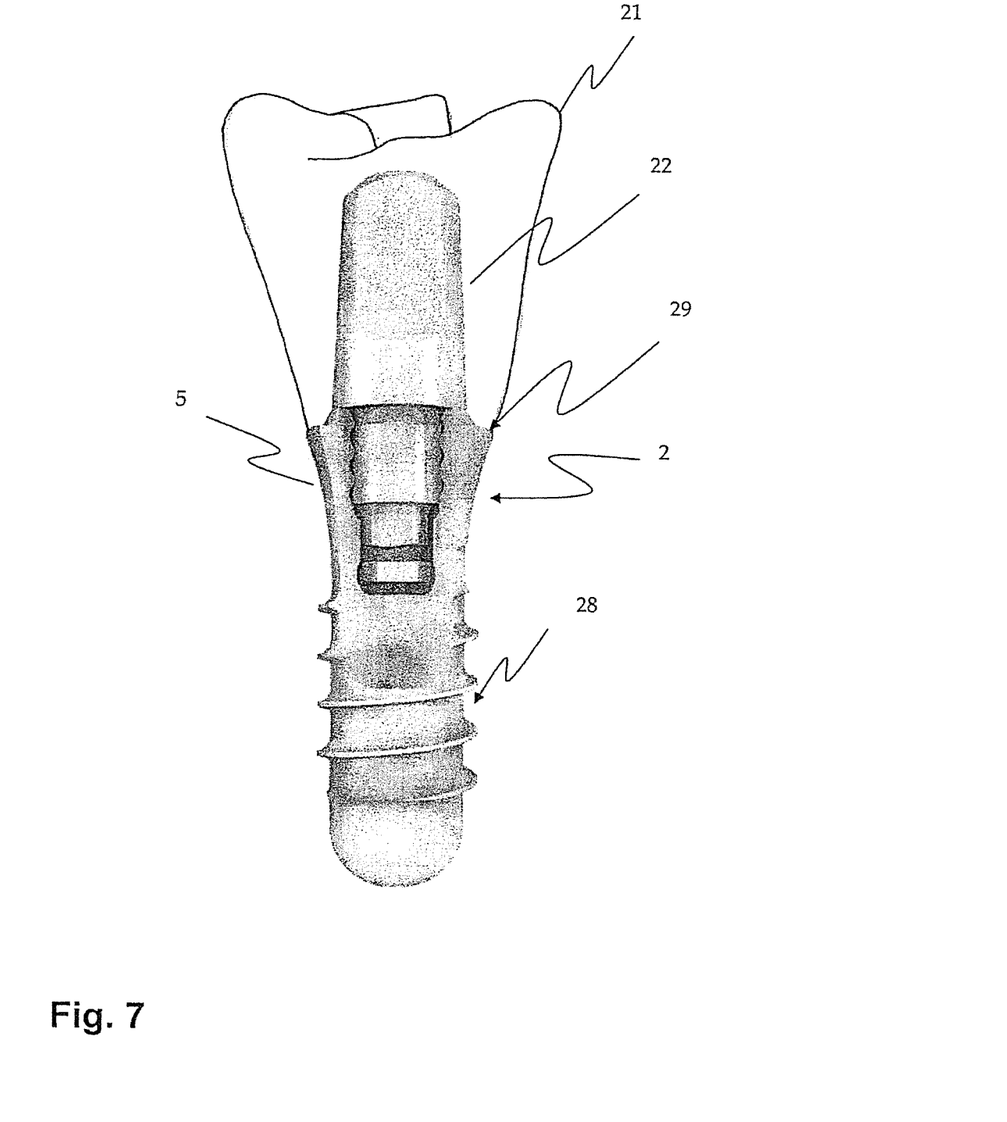
FIG. 7 shows a partial section through the implant according to the invention and abutment with schematically represented crown attachment.

FIG. 7 shows a section through the implant 1 according to the invention which comprises an external thread 28, an abutment 22 which is inserted into the receiving opening of the implant, with a crown 21 placed in position. The circumferential shoulder 5 of the receiving opening 2 is realized in a step-shaped manner. This enables a corresponding horizontal supporting surface 29 for the crown 21 such that the required minimum wall thickness in the case of ceramic crowns is able to be maintained.

Figure 8:
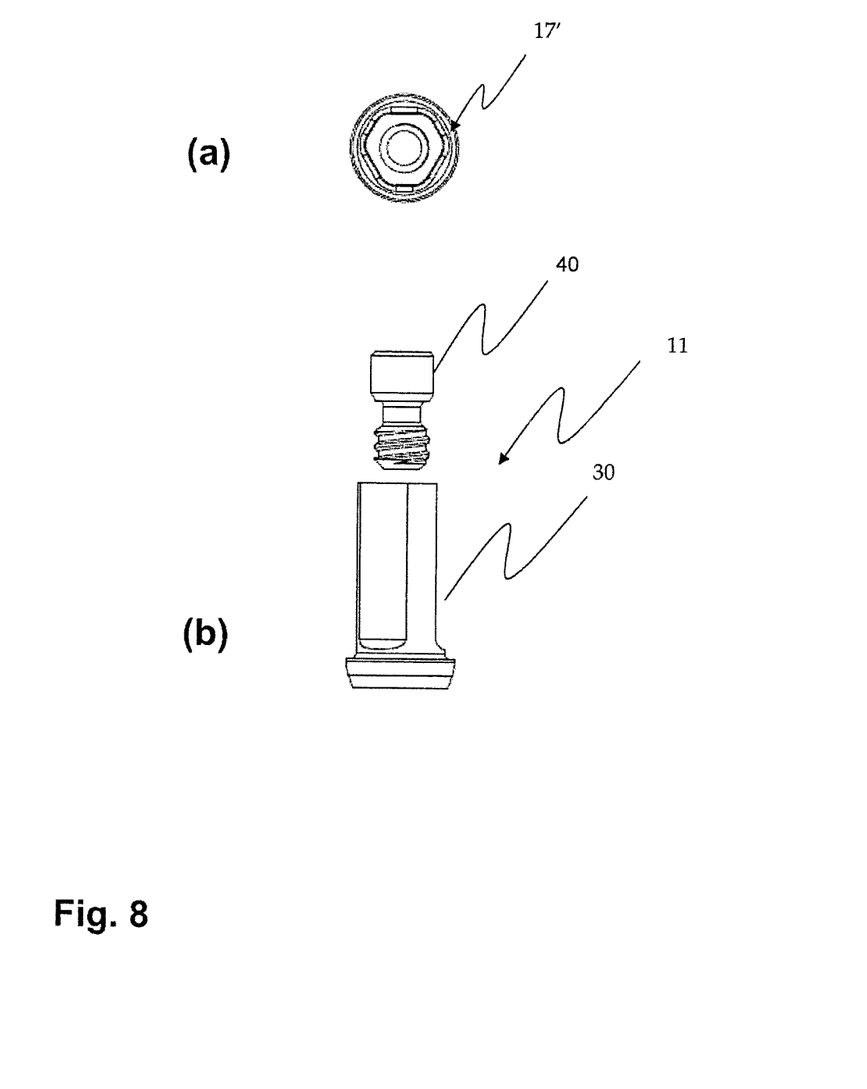
FIG. 8 shows (a) cross sectional representation of temporary treatment including fixing screw and sleeve, (b) a side view of temporary treatment including fixing screw and sleeve.

FIG. 8 shows a temporary dental product 11 which can be connected to the implant according to the invention. The temporary product is constructed in two parts and includes a fixing screw 40 and a sleeve 30. On the side on which it is in contact with the circumferential shoulder 5 of the receiving opening 2 of the implant 1, the sleeve 30 comprises a proximal recess 17'. If the dentist places the sleeve 30 onto the implant, the proximal recess 17' engages in the indexing on the implant and is aligned in this way in relation to the proximal inner polygon 3 of the receiving opening of the implant. The sleeve 30 is fixed on the implant by means of the fixing screw 40 which engages by way of its proximal end into the internal thread 8 of the implant (not visible in FIG. 8).

Figure 9:
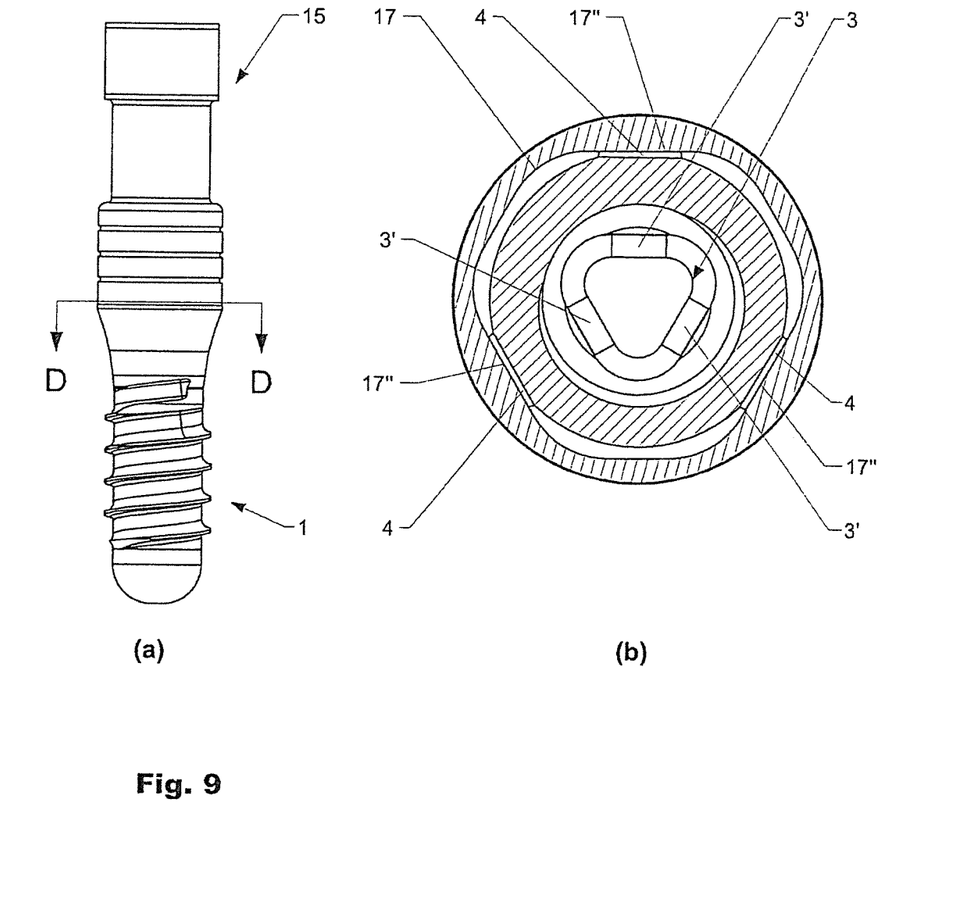
FIG. 9 shows (a) a side view of the transfer coping placed onto the implant, (b) a section DD of the cross sectional area through the transport coping and the implant.

FIG. 9(a) shows the transfer coping 15 connected to the implant 1 according to the invention without fixing by way of the retaining pin. FIG. 9(b) shows a section through the transfer coping 15 and through the implant 1 on the axis DD. Said representation illustrates that the indexing 4 arranged on the circumferential shoulder 5 is aligned with the side faces 3' of the inner polygon 3. The proximal recess 17 of the transfer coping 15 engages by way of its inner face 17" into the indexing 4, as a result of which a rotation-proof position which is aligned to the inner polygon 3 is achieved.

Figure 10:
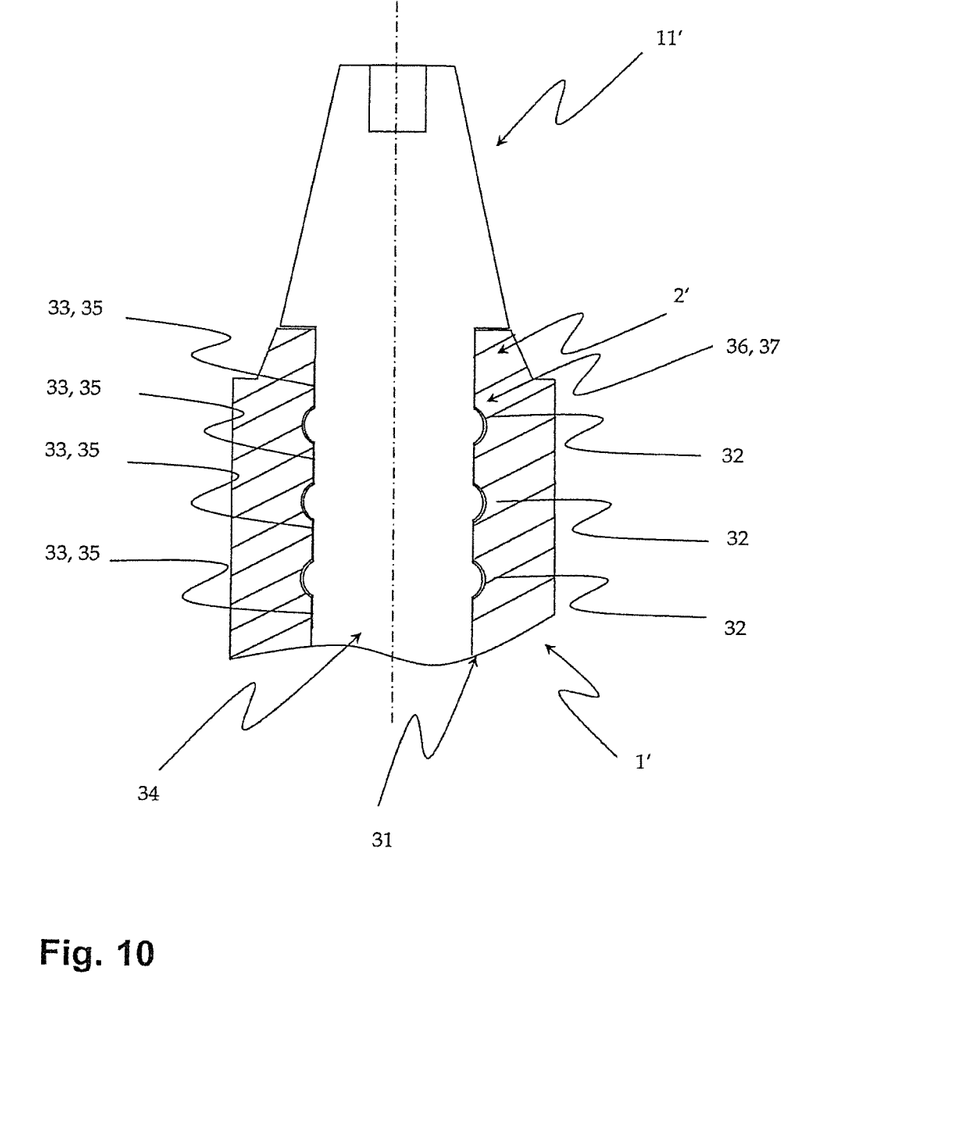
FIG. 10 shows a partially schematic sectional representation of the receiving opening of the implant with a fitting cylinder bore, overlapping internal thread and introduced schematically-shown tooth replacement component.

FIG. 10 shows a schematic representation of a further preferred embodiment of the implant 1' according to the invention, in part in a schematic manner wherein the receiving opening 2' includes a fitting cylinder bore 31. The fitting cylinder bore 31 is overlapped in the axial direction by an internal thread 32. The fitting cylinder bore comprises a cylindrical proportion 33. A stem 34 of a tooth replacement component 11' is inserted into the receiving opening 2'. The stem 34 forms a fit 35 with the cylindrical proportion 33 of the fitting cylinder bore 31 on the contact faces. The stem 34 of the tooth replacement component 11' comprises an external thread 36 with corresponding threaded flanks 37 which are screw-connected to the internal thread 32. If the tooth replacement component 11' is inserted in the implant 1' according to the invention, the threaded flanks 37 are only subject to tensile loading.

In the embodiment shown in FIG. 10, the fitting cylinder 31, measured on its cylindrical lateral surface, comprises a cylindrical proportion of 28%. The internal thread 32, which overlaps the fitting cylinder bore, comprises a proportion of 72% with reference to the cylindrical lateral surface.

Figure 11:
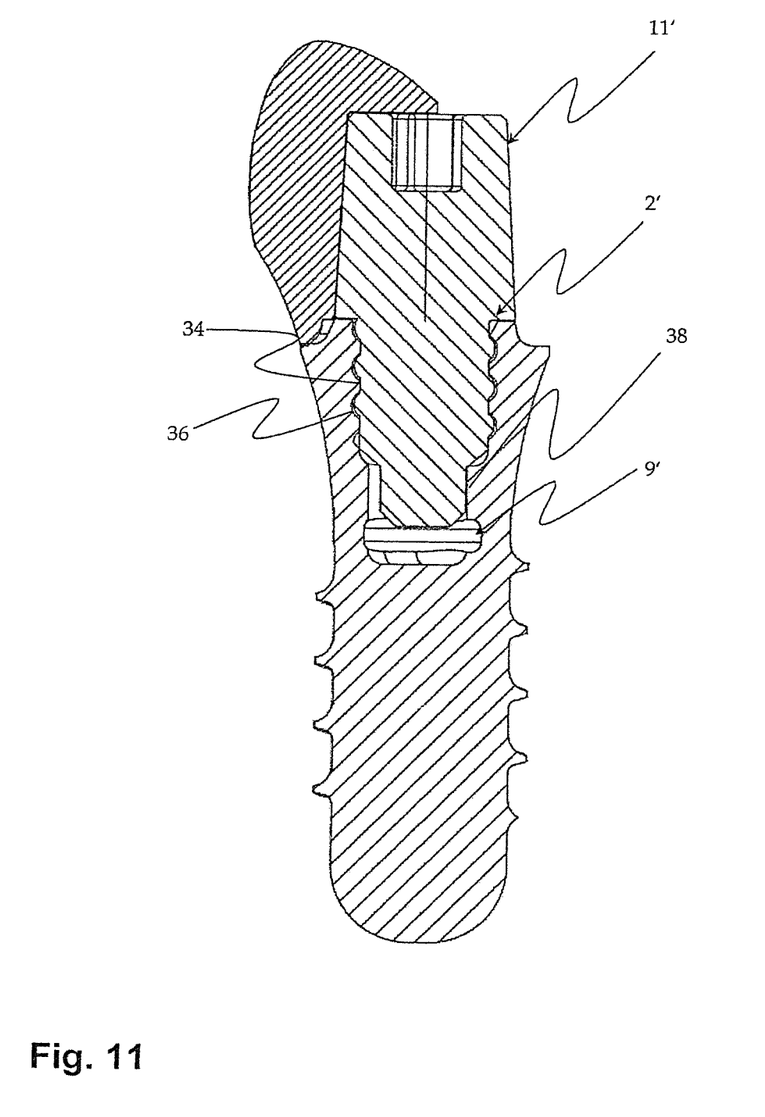
FIG. 11 shows a further embodiment, wherein the receiving opening of the implant shows part of a bayonet closure in a schematic manner and part of a tooth crown placed thereon is shown.

FIG. 11 shows the receiving opening 2' which shows part of the bayonet closure 9' as a further portion, this is preferably arranged on a proximal end of the receiving opening 2'. The stem 34 comprises an external thread 36 which is screw-connected to the internal thread 32. An outer polygon 38, which engages in an inner polygon of the implant 1', is arranged on the tooth replacement component in the proximal direction with respect to the external thread 36.

Figure 12:
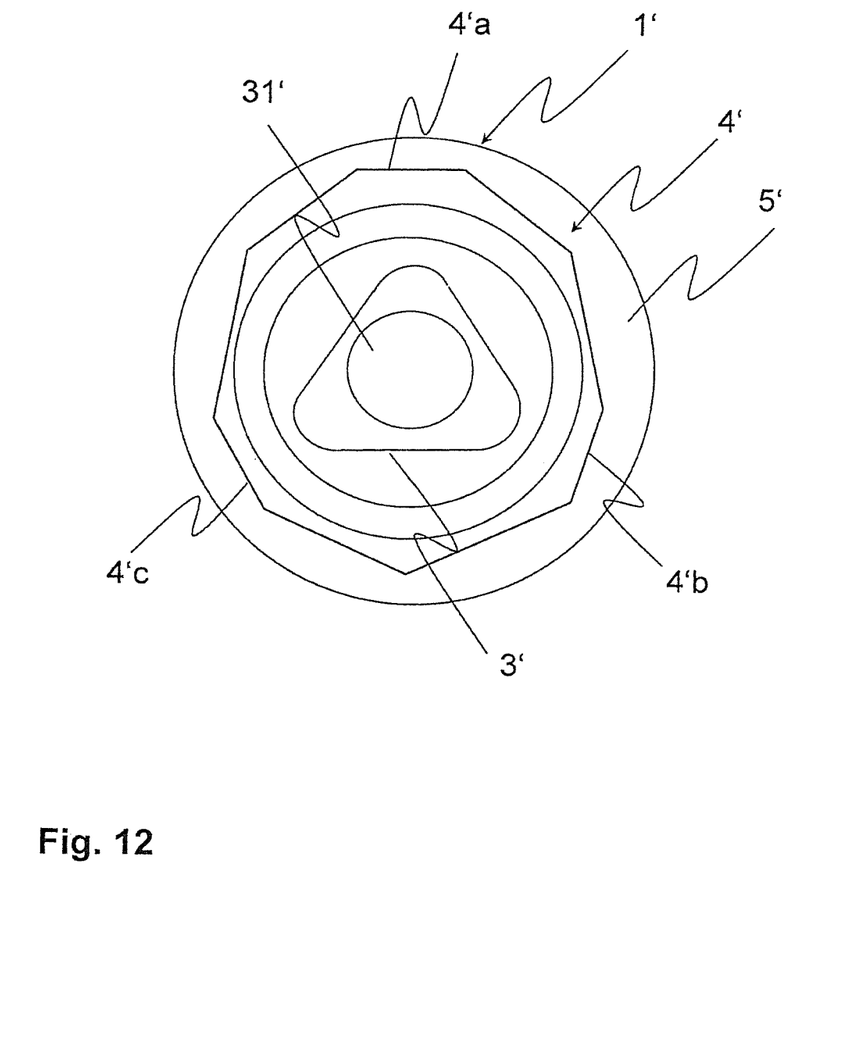
FIG. 12 shows a view from above of the implant according to the invention with a specific embodiment of the indexing.

FIG. 12 shows a view from above of the implant 1' which comprises a receiving opening with an inner polygon 3' in the form of a triangle and a fitting cylinder bore 31'. An indexing 4' is arranged on the circumferential shoulder 5'.

In the embodiment according to FIG. 12, the indexing 4' is realized as a nonagon, three of the sides 4'a to 4'c of the nonagon being developed shorter than the remaining six sides. The three sides 4'a to 4'c reproduce the position of the inner polygon 3' which comprises the form of a triangle. The sides 4'a to 4'c are arranged in the embodiment according to FIG. 12 in such a manner that they index the position of the corners of the triangle. An advantage produced from this arrangement is that a correspondingly large area can be made available for indexing, which facilitates the handling of the tooth replacement system for the dentist.

What is claimed is:

1. A tooth implant system comprising:
a tooth replacement component including a stem (34); and
an implant (1) for osseointegration into a jaw bone, the implant comprising a receiving opening (2), wherein at least a portion of the receiving opening (2) toward a proximal end of the implant comprises an inner polygon (3), wherein at a distal end, the implant (1) includes an indexing (4) on an external surface which reproduces a radial angular position and geometry of the inner polygon (3) of the receiving opening (2), wherein a further portion of the receiving opening (2) comprises a fitting cylinder bore (31), wherein the fitting cylinder bore (31) includes a length with a cylindrical lateral surface that is overlapped in an axial direction by an internal thread, wherein the internal thread forms a threaded connection with the stem (34) of the tooth replacement component and portions of the cylindrical lateral surface exposed between wrappings of the internal thread form a fit (35) in direct contact with the stem (34), and wherein 50% to 80% of the cylindrical lateral surface of the length of the fitting cylinder bore (31) is overlapped by the internal thread, wherein the threaded connection comprises a clearance fit around all surfaces of the internal thread (32) between the internal thread (32) and a corresponding external thread (36) of the stem (34), and forms an adhesive drainage channel.

2. The implant system as claimed in claim 1, wherein the indexing (4) reproduces an arrangement and number of side faces (31) of the inner polygon (3).

3. The implant system as claimed in claim 1, wherein the indexing (4) is arranged on a shoulder (5) which runs around the receiving opening (2) on an end face.

4. The implant system as claimed in claim 1, wherein the internal thread is arranged distally with respect to the inner polygon (3).

5. The implant system as claimed in claim 4, wherein the receiving opening (2) comprises a further cylinder portion (19) between the internal thread and the inner polygon (3).

6. The implant system as claimed in claim 1 wherein a further portion of the receiving opening (2) comprises part of a bayonet closure (9).

7. The implant system as claimed in claim 1, wherein the indexing (4) comprises a graphic and/or physical element,.

8. The implant system as claimed in claim 7, wherein the indexing (4, 4') comprises a polygon.

9. The implant system as claimed in claim 8, wherein the polygon comprises sides of different lengths, including three short and six long sides.

10. The implant system as claimed in claim 1, wherein the implant (1) is produced from a ceramic material.

11. The implant system as claimed in claim 1, wherein the indexing (4) corresponds with a proximal recess (17) of a second tooth replacement component (11) which is matched to a geometry of the indexing (4).

12. The implant system as claimed in claim 11, wherein the second tooth replacement component (11) comprises the proximal recess (17) in a form of a polygon on a side that corresponds with the indexing (4).

13. The implant system as claimed in claim 11, wherein the indexing (4, 4') comprises a nonagon.

14. The implant system as claimed in claim 11, wherein the proximal recess (17) of the second tooth replacement component (11) interacts in a positive locking manner with the indexing (4) of the implant (1) such that said recess (17) is aligned precisely at a desired angular position in relation to the inner polygon (3) of the receiving opening (2) of the implant.

15. The implant system as claimed in claim 14, wherein the proximal recess (17) of the second tooth replacement component (11) engages axially in the indexing with reference to a longitudinal axis of the implant.

16. The implant system as claimed in claim 14, wherein the second tooth replacement component (11) is constructed in two parts, a first part (12) includes a screw thread (20) which is connectable to the internal thread (8, 32) of the implant (1) and a second part (13) corresponds with the indexing (4) of the implant (1).

17. The implant system as claimed in claim 16, wherein the second tooth replacement component (11) comprises an impression coping (18) which includes a retaining pin (14) as the first part and a transfer coping (15) as the second part.

18. The implant system as claimed in claim 14, wherein the implant (1) is produced from zirconium dioxide and/or aluminum dioxide.

19. The implant system as claimed in claim 1, wherein the internal thread comprises a round thread.

20. The implant system as claimed in claim 1, wherein the indexing (4) comprises a physical element selected from at least one notch (10), groove, recess or bore.

21. A tooth implant system comprising:
a tooth replacement component including a stem (34); and an implant (1) for osseointegration into a jaw bone, the implant comprising a receiving opening (2), wherein at least a portion of the receiving opening (2) toward a proximal end of the implant comprises an inner polygon (3), wherein at a distal end, the implant (1) includes an indexing (4) on an external surface which reproduces a radial angular position and geometry of the inner polygon (3) of the receiving opening (2), wherein a further portion of the receiving opening (2) comprises a fitting cylinder bore (31), wherein the fitting cylinder bore (31) includes a length with a cylindrical lateral surface that is overlapped in an axial direction by an internal thread, wherein the internal thread comprises a round thread and forms a threaded connection with the stem (34) of the tooth replacement component and portions of the cylindrical lateral surface exposed between wrappings of the internal thread form a fit (35) in direct contact with the stem (34), and wherein 50% to 80% of the cylindrical lateral surface of the length of the fitting cylinder bore (31) is overlapped by the internal thread, wherein the threaded connection comprises a clearance fit around all surfaces of the internal thread between the internal thread and a corresponding external thread of the stem (34), and forms an adhesive drainage channel.

22. The implant system as claimed in claim 21, wherein the receiving opening (2) comprises part of a bayonet closure (9) arranged at a receiving opening proximal end of the receiving opening (2).

\* \* \* \* \*